(12) United States Patent
Takagi

(10) Patent No.: US 6,760,081 B2
(45) Date of Patent: Jul. 6, 2004

(54) LIQUID CRYSTAL DISPLAY DEVICE HAVING UNIFORM FEEDTHROUGH VOLTAGE COMPONENTS

(75) Inventor: Kouji Takagi, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 09/577,734

(22) Filed: May 23, 2000

(65) Prior Publication Data

US 2003/0063233 A1 Apr. 3, 2003

(30) Foreign Application Priority Data

May 25, 1999 (JP) ............................................ 11-145465

(51) Int. Cl.⁷ ......................................... G02F 1/1343
(52) U.S. Cl. ............................. 349/38; 349/62; 349/65
(58) Field of Search ............................. 349/38, 65, 61, 349/62, 64, 63; 362/26, 29, 30, 31

(56) References Cited

U.S. PATENT DOCUMENTS

| | | | | |
|---|---|---|---|---|
| 6,028,650 A | * | 2/2000 | Kuroha et al. ................ | 349/38 |
| 6,334,689 B1 | * | 1/2002 | Taniguchi et al. ............ | 362/31 |
| 6,528,357 B2 | * | 3/2003 | Dojo et al. .................. | 438/151 |

FOREIGN PATENT DOCUMENTS

| | | |
|---|---|---|
| JP | 63-194232 | 8/1988 |
| JP | 04-237023 | 8/1992 |
| JP | 5-15023 | 2/1993 |
| JP | 05-232509 | 9/1993 |
| JP | 06-160901 | 6/1994 |
| JP | 8-262484 | 10/1996 |
| JP | 10-39328 | 2/1998 |
| JP | 10-055138 | 2/1998 |
| JP | 10-90668 | 4/1998 |
| JP | 10-268357 | 10/1998 |
| JP | 11-038445 | 2/1999 |
| JP | 11-084428 | 3/1999 |
| JP | 11-109369 | 4/1999 |
| KR | 1999-0013747 | 2/1999 |

* cited by examiner

Primary Examiner—Tarifur R. Chowdhury
(74) Attorney, Agent, or Firm—Scully, Scott, Murphy & Presser

(57) ABSTRACT

A liquid crystal display (LCD) device having uniform feedthrough voltage components. The LCD device comprises a LCD panel and a backlight portion for illuminating the LCD panel from the backside. The LCD panel has: a plurality of pixels which are disposed in a matrix having rows and columns and each of which has at least a thin film transistor (TFT) and a pixel electrode; a plurality of gate signal lines which extend from a gate signal input portion disposed along a side of the liquid crystal display panel and each of which is coupled with the TFT's in a row of the matrix; and auxiliary capacitor portions each additionally coupled with a pixel electrode of one of the pixel. The width of the gate signal line becomes narrower and thereby capacitance of the auxiliary capacitor portions becomes smaller as the distance from the gate signal input portion becomes larger. Also, luminance of backlight by the backlight portion becomes lower as the distance from the gate signal input portion becomes larger.

11 Claims, 15 Drawing Sheets

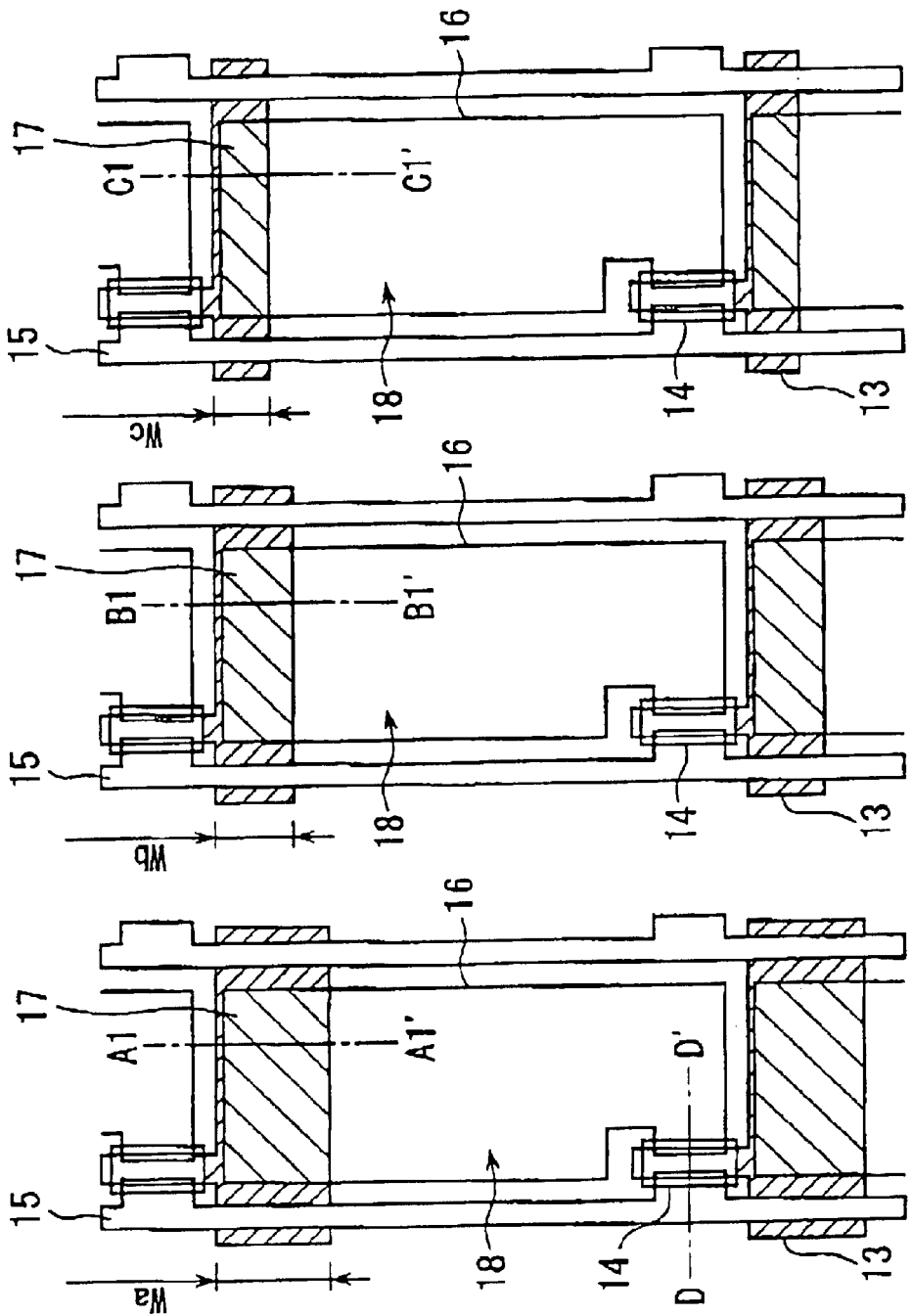

PRIOR ART

PRIOR ART

LIQUID CRYSTAL DISPLAY DEVICE HAVING UNIFORM FEEDTHROUGH VOLTAGE COMPONENTS

FIELD OF THE INVENTION

The present invention relates generally to a liquid crystal display device, and more particularly to a liquid crystal display device which has uniform feedthrough voltage components, a high image luminance, and high image display quality.

BACKGROUND OF THE INVENTION

An active matrix type liquid crystal display panel is a liquid crystal display panel in which a TFT (Thin Film Transistor) is added to each of pixel electrodes disposed in a matrix on a surface of a substrate. Recently, the active matrix type liquid crystal display panel is widely used in a display apparatus for a portable type personal computer or for a desktop type personal computer, in a projection type display apparatus, in a liquid crystal display television and the like. This is because, in the active matrix type liquid crystal display panel, a polarity inversion drive system and the like are recently adopted and thereby display quality such as an image contrast, a response speed to a moving picture signal and the like is improved. However, recently, the panel size of the liquid crystal display device becomes large, each pixel becomes minute and an aperture ratio of each pixel becomes high. For these reasons, a length of each gate wiring conductor becomes long and a width of each gate wiring conductor becomes small, so that an electrical resistance of each gate wiring conductor inevitably increases.

Also, according to an increase in the length of and a decrease in the width of each of the gate wiring conductors, a waveform of a gate pulse applied to the liquid crystal display panel is blunted, because the pixel electrodes driven by the gate pulse have capacitance as well as because the gate wiring conductor has large gate wiring resistance. Further, as a distance from an input end of the gate pulse becomes long, the resistance of the gate wiring conductor becomes large, so that degree of bluntness of the pulse waveform also becomes large as the distance from the input end of the gate pulse becomes long.

For example, in a liquid crystal display panel 1 schematically shown in FIG. 12, signal input portions 2 and 3 are disposed along a left side portion and a lower or bottom side portion of the panel 1. Assuming that the signal input portion 2 is a gate signal input portion from which gate signals are supplied to TFT's in pixels disposed in a matrix, distances from the gate signal input portion 2 to the TFT's become larger in order of points (a), (b), (c), or in order of points (A), (B), (C) shown in the drawing. Therefore, gate wiring resistance becomes larger in the same order.

As a result, depending on difference of bluntness of the gate signals, i.e., gate pulses, magnitude of a shift of a potential of a pixel electrode caused when the gate pulse is turned off, that is, magnitude of a feedthrough voltage varies.

As shown by signal waveforms in FIGS. 5A through 5D, the feedthrough voltage becomes a voltage difference, i.e., VFDIN or VFDOUT, between the center potential of drain pulses, i.e., DPC, and the center potential of source pulses, i.e., SPC. Here, it is assumed that VFDIN designates a feedthrough voltage at an input end of the gate pulse and VFDOUT designates a feedthrough voltage at an end opposite to the input end of the gate pulse. In such case, since the feedthrough voltage becomes smaller as the distance from the input end of the gate pulse becomes larger, there is a relationship VFDIN>VFDOUT.

When the difference of the feedthrough voltages within an image display area becomes large, there occur image persistence, stain and the like and thereby display quality is deteriorated. Conventionally, in order to minimize the difference of the feedthrough voltages within the image display area, a voltage of an opposing electrode is lowered taking a voltage drop of an offset of a drain signal caused by the feedthrough at the center of the image display area into consideration. However, although an optimum condition is obtained at the center of the image display area, an optimum condition is not obtained at the peripheral portions of the image display area. Therefore, at the peripheral portions, since a DC voltage component is applied to liquid crystal, the above-mentioned image persistence, stain and the like may occur and quality of image display is deteriorated. That is, even if the voltage of the opposing electrode is adjusted to obtain an optimum condition at the center of the image display area, a DC voltage is applied to the liquid crystal at the peripheral portions and it is difficult to effectively avoid deterioration of the image display quality mentioned above.

Here, the reason why the feedthrough voltage varies depending on the blunting of the gate pulse waveform will be described.

FIG. 4 illustrates an equivalent circuit of a portion of a liquid crystal display panel. As shown in FIG. 4, an equivalent circuit of a pixel comprises a TFT 14 whose drain (D) is coupled to a drain signal line 15 and whose gate (G) is coupled to a gate signal line 13, a gate-source capacitance Cgs, a storage capacitance Csc, and a liquid crystal (LC) capacitance Clc. The storage capacitance Csc exists between the source electrode (S) of the TFT 14 and an adjacent gate signal line 13. The LC capacitance Clc exists between the source electrode of the TFT 14, i.e., a display electrode, and an opposing electrode 21.

By using the gate-source capacitance Cgs, the storage capacitance Csc, the liquid crystal (LC) capacitance Clc, and a gate pulse amplitude $\Delta Vg$, a feedthrough voltage Vfd is represented approximately as follows.

$$Vfd=[Cgs/(Clc+Csc+Cgs)]*\Delta Vg \tag{1}$$

On the other hand, when a falling edge of the gate pulse is blunted due to a resistance of a gate wiring conductor, a current flows from the source electrode to the drain signal line until the TFT 14 is completely turned off. A total amount of such current, i.e., a TFT leakage, becomes as follows.

$$\int Ids\, dt$$

Taking the total amount of such current into consideration, the feedthrough voltage Vfd becomes as follows.

$$Vfd=(Cgs*\Delta Vg-\int Ids\, dt)/(Clc+Csc+Cgs) \tag{2}$$

Here, the total amount of the current, i.e., $$\int Ids\, dt$$

is approximately proportional to the degree of bluntness of the gate pulse, and therefore becomes as follows at the side of the gate signal input portion 2.

$$\int Ids\, dt \approx 0$$

Therefore, the feedthrough voltage components differ between the side of the gate signal input portion 2 and the side opposite thereto, and a feedthrough voltage difference $\Delta Vfd$ in an image display area is produced which is a difference between the values of the formulas (1) and (2) and is represented as follows.

$$\Delta Vfd=\int Ids\, dt/(Clc+Csc+Cgs) \tag{3}$$

In order to uniformalize the feedthrough voltage component within an image display area, it is possible to lower gate wiring resistance to reduce quantity of bluntness of the gate pulse. To realize this, it is possible to enlarge a width or a film thickness of the gate wiring conductor, and to change wiring material into those having lower specific resistance, for example, aluminum, gold and the like. However, when enlarging the film thickness of the wiring conductor and when changing the wiring material, it is necessary to change a manufacturing process of the liquid crystal display device. Also, when the width of the wiring conductor is enlarged, an aperture ratio of the liquid crystal display device is deteriorated.

In order to solve such problem, for example, Japanese patent laid-open publication No. 10-39328 discloses a liquid crystal display device in which feedthrough voltage components are uniformalized within an image display area, and variation of DC voltage components applied to the liquid crystal in the image display area is suppressed. Thereby, image persistence, stain and the like of a liquid crystal display panel are improved to obtain a high image display quality.

In the liquid crystal display device of the Japanese laid-open publication No. 10-39328, an auxiliary capacitor portion is added to each of a plurality of pixel electrodes formed on a TFT substrate. Also, the capacitance of the auxiliary capacitor portion becomes smaller as the distance from the input end of the gate signal line coupled with gate terminals of TFT's becomes farther.

For example, capacitance of the auxiliary capacitor portion additionally provided to each of the pixel electrodes is determined by an overlapped area of the pixel electrode with the gate signal line via an interlayer insulating film. The overlapped area becomes smaller as the distance from the input end of the gate signal line becomes larger.

FIG. 12 also corresponds to a plan view of a liquid crystal display panel disclosed in Japanese patent laid-open publication No. 10-39328. In this liquid crystal display panel, there are provided signal input portions 2 and 3 along the left side portion and the bottom side portion of the panel. It is assumed that gate pulses are inputted from the signal input portion 2, that is, the gate signal input portion 2, to a pixel area 1a. Also, FIGS. 13A, 13B and 13C are partial enlarged views showing pixel portions A, B and C in FIG. 12, respectively. FIGS. 14A, 14B and 14C are enlarged cross sectional views along the line A—A' of FIG. 13A, the line B—B' of FIG. 13B and the line C—C' of FIG. 13C, respectively.

As shown in FIGS. 13A through 13C and FIGS. 14A through 14C, on a glass substrate 19, gate signal lines 13 each having a predetermined pattern including gate electrode portions for TFT's 14, an interlayer insulating film 23, and source/drain regions made of amorphous silicon and the like are sequentially formed, and thereby TFT's 14 are fabricated. Then, drain signal lines 15 are formed such that the drain signal lines 15 are coupled to the drain regions, and pixel electrodes 16 are formed on the interlayer insulating film 23 and coupled to the respective source regions of the TFT's 14. Each of the pixel electrodes 16 is patterned such that the pixel electrode 16 partially overlaps with the gate signal line 13 coupled to the TFT 14 of the adjacent pixel. The pixel electrodes 16 are covered by a protective film 27. Also, on a glass substrate 20 disposed opposite to the glass substrate 19, there is formed an opposing electrode 21, and a gap portion between the opposing electrode 21 and the protective film 27 on the pixel electrodes 16 and the like is filled with liquid crystal 22.

An equivalent circuit of the liquid crystal display device structure mentioned above can also be represented by the circuit shown in FIG. 4. That is, an equivalent circuit of a pixel comprises a TFT 14 whose drain is coupled to a drain signal line 15 and whose gate is coupled to a gate signal line 13, a gate-source capacitance Cgs, a storage capacitance Csc, and a liquid crystal (LC) capacitance Clc. In this case, the storage capacitance Csc is composed by capacitively coupling the gate signal line 13 and the pixel electrode 16 via the interlayer insulating film 23. Also, the overlapped areas between the gate signal line 13 and the pixel electrodes 16 become smaller as the distance from the gate signal input portion 2 becomes larger, that is, from a portion A toward a portion C. As a result thereof, the storage capacitance Csc becomes smaller from the portion A toward the portion C.

In this structure, as the distance from the gate signal input portion 2 becomes larger, the feedthrough voltage component becomes smaller due to the TFT leakage caused by the blunting of the gate pulse. However, since the storage capacitance Csc becomes smaller as the distance from the gate signal input portion 2 becomes larger, the variation of the feedthrough voltage component is compensated by the variation of the storage capacitance Csc. That is, assuming that the feedthrough voltage component and the storage capacitance at the portion A of FIG. 12 are Vfdin and Csc, respectively, and that the feedthrough voltage component and the storage capacitance at the portion C of FIG. 12 are Vfdout and Csc', respectively, the feedthrough voltage components Vfdin and Vfdout are respectively represented by the following formulas (4) and (5).

$$Vfdin = [Cgs/(Clc+Csc+Cgs)]*\Delta Vg \quad (4)$$

$$Vfdout = (Cgs*\Delta Vg - \int Ids\,dt)/(Clc+Csc'+Cgs) \quad (5)$$

In these formulas (4) and (5), if the storage capacitance Csc and Csc' are the same, Vfdin>Vfdout. Therefore, by determining the values of Csc and Csc' such that the values Vfdin and Vfdout become equal to each other, it is possible to uniformalize the feedthrough voltage components both at the portion A and the portion C.

The reason why the feedthrough voltage components can be uniformalized by this method will be described with reference to signal waveform diagrams.

FIGS. 5A and 5B show signal waveforms at the portion A mentioned above, and FIGS. 5C and 5D show signal waveforms at the portion C. Waveforms shown in each of FIG. 5A and FIG. 5C are signal waveforms of gate pulses GP and drain pulses DP inputted respectively to gate signal lines and drain signal lines, and a waveform shown in each of FIG. 5B and FIG. 5D is a waveform of a source pulse SP actually written into a pixel electrode. At the portion A, the source pulse SP is influenced by the falling down of the gate pulse GP, and the potential of the source pulse center SPC becomes lower than the drain pulse center DPC by the amount Vfdin. On the other hand, at the portion C, because of the TFT leakage mentioned above, the influence by the falling down of the gate pulse GP becomes small. Therefore, as mentioned before, by making the storage capacitance on the side opposite to the input side of the gate pulse GP smaller than the storage capacitance on the input side of the gate pulse GP taking the amount of the TFT leakage into consideration, it is possible to reduce the influence by the falling down of the gate pulse GP and to equalize the values of Vfdin and Vfdout with each other.

In practice, it is necessary to previously perform simulation and/or experiment and to evaluate the value of $$\int Ids\,dt.$$

Then, required variation of storage capacitance is obtained and the storage capacitance is gradually decreased as the distance from the side of the gate pulse input portion 2 becomes large. Here, the relationship between the storage capacitance values Csc and Csc' is shown below.

$$Csc'=[(Cgs*\Delta Vg-\int Ids\ dt)(Clc+Csc+Cgs)]/(Cgs*\Delta Vg)-(Cls-Cgs)(6)$$

By this formula, the storage capacitance Csc' at the portion C is obtained, and the storage capacitance is gradually decreased from Csc to Csc' as the location changes from the gate signal input portion 2 to the opposite side of the gate signal input portion 2. In practice, as shown in FIGS. 13A through 13C, an overlapped area 17a, that is, an overlapped distance, between the pixel electrode 16 and the gate signal line 13 of the former stage is gradually reduced to gradually decrease the storage capacitance, as the location changes from the gate signal input portion 2 to the opposite end.

FIG. 15 shows a result of actual measurement of the feedthrough voltage components in an image display area, which is shown in Japanese patent laid-open publication No. 10-39328. In a conventional liquid crystal display panel which does not use the above-mentioned structure, the value of the feedthrough voltage component becomes smaller as the distance from the gate pulse input portion becomes larger. However, in a liquid crystal display panel which uses the above-mentioned structure, the value of the feedthrough voltage component is substantially uniform at all locations including the portion A and the portion C, regardless of the distance form the gate signal input portion. Therefore, in the liquid crystal display panel having the above-mentioned structure, the feedthrough voltage components within the image display area are uniformalized, and it is possible to suppress occurrence of image persistence, stain and the like within the whole image display area of the liquid crystal display panel to improve quality of image display. However, there exists a constant desire to further improve a quality of displayed image in a liquid crystal display device.

SUMMARY OF THE INVENTION

Therefore, it is an object of the present invention to provide a liquid crystal display device in which feedthrough voltage components within an image display area can be uniformalized and in which luminance of displayed image can be further increased.

It is another object of the present invention to provide a liquid crystal display device which has a structure different from the above-mentioned conventional structure but in which feedthrough voltage components within an image display area can be uniformalized to improve image display quality.

It is another object of the present invention to provide a liquid crystal display device in which feedthrough voltage components within an image display area can be uniformalized and image persistence, stain and the like within whole image display area can be suppressed to improve image display quality.

It is still another object of the present invention to provide a liquid crystal display device in which feedthrough voltage components within an image display area can be uniformalized and in which luminance of displayed image can be increased and uniformalized to improve image display quality.

It is still another object of the present invention to provide a liquid crystal display device in which feedthrough voltage components within an image display area can be uniformalized and image persistence, stain and the like within whole image display area can be suppressed, and in which luminance of displayed image can be increased and uniformalized, thereby image display quality can be improved.

According to an aspect of the present invention, there is provided a liquid crystal display device having a liquid crystal display panel, the liquid crystal display panel comprising: a plurality of pixels which are disposed in a matrix having rows and columns and each of which has at least a thin film transistor (TFT) and a pixel electrode; a plurality of gate signal lines which extend from a gate signal input portion disposed along a side of the liquid crystal display panel and each of which is coupled with the TFT's in a row of the matrix; and auxiliary capacitor portions each additionally coupled with a pixel electrode of one of the pixel, the width of the gate signal line becoming narrower and thereby capacitance of the auxiliary capacitor portions becoming smaller as the distance from the gate signal input portion becomes larger.

In this case, it is preferable that the liquid crystal display device further comprises a backlight portion for illuminating the liquid crystal display panel from the backside thereof, luminance of backlight by the backlight portion becomes lower as the distance from the gate signal input portion becomes larger.

It is also preferable that an area of an aperture portion of the pixel becomes larger as the distance from the gate signal input portion becomes larger.

It is further preferable that capacitance of each of the auxiliary capacitor portions is determined by an area of an opposing portion between a pixel electrode of a pixel and a gate signal line coupled with an adjacent pixel via an interlayer insulating film and a nitride film between the pixel electrode and the gate signal line.

It is advantageous that capacitance of each of the auxiliary capacitor portions is determined by an area of an opposing portion between a pixel electrode of a pixel and a gate signal line coupled with an adjacent pixel via an interlayer insulating film between the pixel electrode and the gate signal line.

It is also advantageous that the backlight portion comprises at least one elongated backlight source and a light guide plate which is disposed on the backside of the liquid crystal display panel and which propagates light from the backlight source toward the liquid crystal display panel, the light guide plate comprising printed light scattering portions disposed on a surface thereof for adjusting a distribution of luminance of backlighting.

It is further advantageous that the backlight portion comprises an elongated backlight source disposed along the side of the liquid crystal display panel where the gate signal input portion is disposed.

It is also preferable that the backlight portion comprises an elongated backlight source disposed along the side of the liquid crystal display panel which is perpendicular to the side where the gate signal input portion is disposed.

According another aspect of the present invention, there is provided a liquid crystal display device comprising: (a) a liquid crystal display panel having: a plurality of pixels which are disposed on a TFT substrate in a matrix having rows and columns and each of which has at least a thin film transistor (TFT) and a pixel electrode; a plurality of gate signal lines which extend on the TFT substrate from a gate signal input portion disposed along a side of the liquid crystal display panel and each of which is coupled with the TFT's in a row of the matrix; auxiliary capacitor portions each additionally coupled with a pixel electrode of one of the pixel, the width of the gate signal line becoming narrower and thereby capacitance of the auxiliary capacitor portions becoming smaller as the distance from the gate signal input portion becomes larger; and an opposing substrate which opposes to the TFT substrate while keeping a small gap therebetween, the small gap being filled with liquid crystal; and (b) a backlight portion for illuminating the liquid crystal display panel from the backside thereof, luminance of backlight by the backlight portion becomes lower as the distance from the gate signal input portion becomes larger.

In this case, it is preferable that capacitance of each of the auxiliary capacitor portions is determined by an area of an opposing portion between a pixel electrode of a pixel and a gate signal line coupled with an adjacent pixel via an interlayer insulating film and a nitride film between the pixel electrode and the gate signal line.

It is also preferable that capacitance of each of the auxiliary capacitor portions is determined by an area of an opposing portion between a pixel electrode of a pixel and a gate signal line coupled with an adjacent pixel via an interlayer insulating film between the pixel electrode and the gate signal line.

It is further preferable that the backlight portion comprises at least one elongated backlight source and a light guide plate which is disposed on the backside of the liquid crystal display panel and which propagates light from the backlight source toward the liquid crystal display panel, the light guide plate comprising printed light scattering portions disposed on a surface thereof for adjusting a distribution of luminance of backlighting.

It is advantageous that the backlight portion comprises an elongated backlight source disposed along the side of the liquid crystal display panel where the gate signal input portion is disposed.

It is also advantageous that the backlight portion comprises an elongated backlight source disposed along the side of the liquid crystal display panel which is perpendicular to the side where the gate signal input portion is disposed.

BRIEF DESCRIPTION OF THE DRAWINGS

These and other features, and advantages, of the present invention will be more clearly understood from the following detailed description taken in conjunction with the accompanying drawings, in which like reference numerals designate corresponding parts throughout the figures, and in which:

FIGS. 2A, 2B and 2C are enlarged plan views respectively showing, as a first embodiment of the present invention, detailed structures of portions A, B and C of a liquid crystal display panel in the liquid crystal display device of FIG. 1A;

DESCRIPTION OF A PREFERRED EMBODIMENT

In a liquid crystal display device according to the present invention, capacitance of auxiliary capacitors each provided corresponding to a pixel electrode becomes smaller by making width of a gate signal line narrower as the distance from the gate signal input portion becomes larger. Also, a backlight portion is constituted such that luminance of backlighting becomes lower as the distance from the gate signal input becomes larger. Therefore, it is possible to uniformalize the feedthrough voltage components within an image display area and to suppress image persistence, stain and the like within whole image display area. It is also possible to uniformalize and increase luminance of displayed image. As a result, it becomes possible to further improve image display quality.

With reference to the drawings, embodiments of the present invention will now be described in detail.

First Embodiment

Figure 1A:
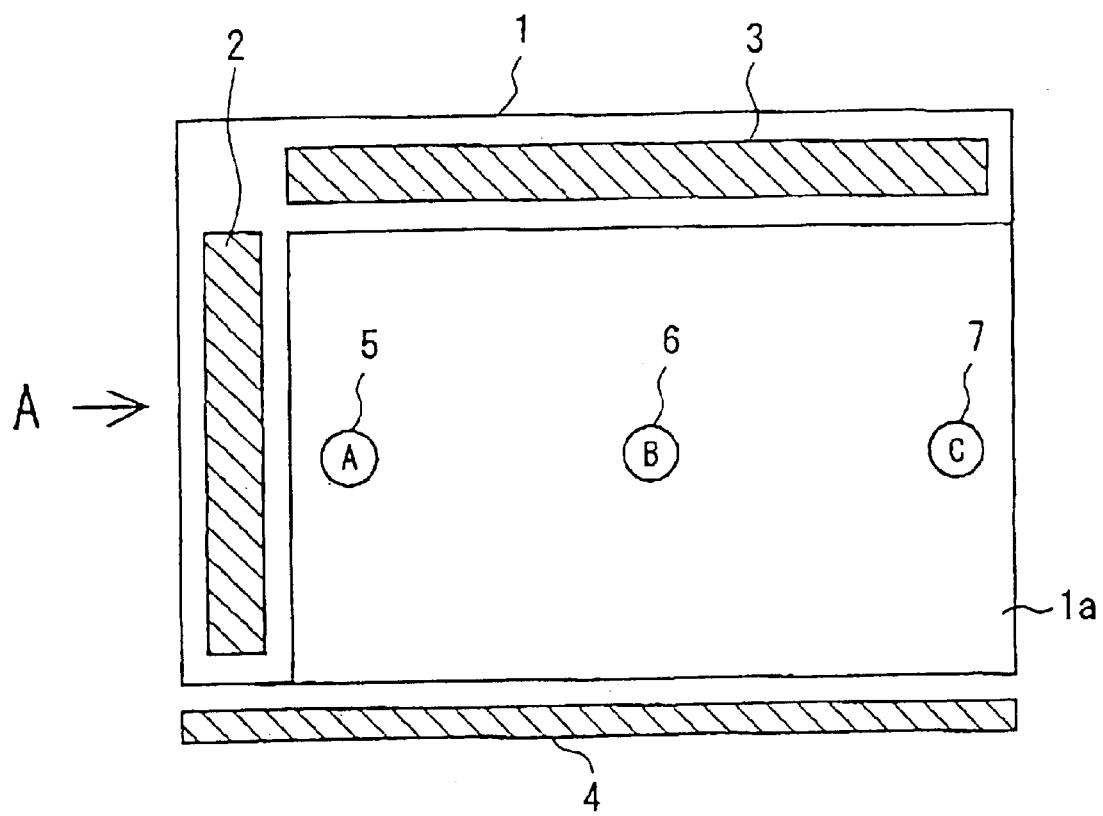
FIG. 1A is a plan view showing a liquid crystal display device according to the present invention.
Figure 1B:
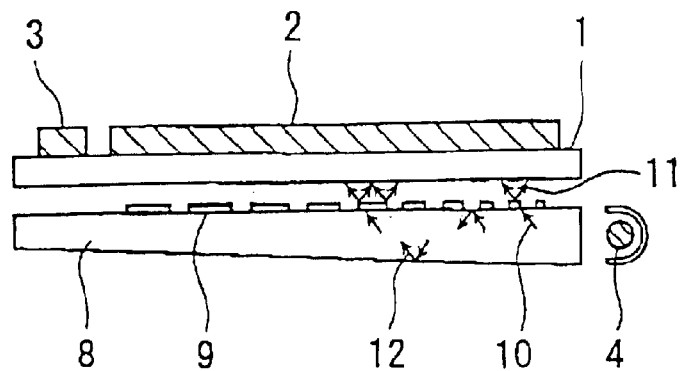
FIG. 1B is a side view of the liquid crystal display device shown in FIG. 1A, as seen from an arrow A in FIG. 1A.

FIG. 1A and FIG. 1B schematically illustrate a liquid crystal display device according to the present invention. In particular, FIGS. 2A through 2C and FIGS. 3A through 3C show detailed structures of the liquid crystal display device of FIGS. 1A and 1B, as a first embodiment of the present invention.

FIG. 1A schematically shows a general structure of the liquid crystal display device including a liquid crystal display panel 1 and a backlight source 4. FIG. 1B is a side view of the liquid crystal display device of FIG. 1A seen from the left side thereof, i.e., seen from the direction shown by an arrow A in FIG. 1A.

The liquid crystal display panel 1 comprises a pixel area 1a where a plurality of pixels are disposed in a matrix having rows and columns. Each pixel (not shown in FIGS. 1A and 1B) comprises a TFT 14 and a pixel electrode 16 which are described later. A plurality of gate signal lines 13 and a plurality of drain signal lines 15 (not shown in FIGS. 1A and 1B) are disposed perpendicularly to each other. Each of the pixels is disposed at a location near the intersection of a gate signal line 13 and a drain signal line 15. Along the left side and the upper side of the liquid crystal display panel 1, there are disposed a gate signal input portion 2 and a drain signal input portion or a signal input portion 3, respectively. The gate signal input portion 2 comprises, for example, a plurality of gate signal input pads or terminals for supplying gate drive pulses to the pixel area 1a. Also, the drain signal input portion 3 comprises, for example, a plurality of drain signal input pads or terminals for inputting drain drive pulses to the panel area 1a.

The backlight source 4 has, for example, an elongated shape and is disposed on the lower side of the liquid crystal display panel 1. As shown in FIG. 1B, an optical guide plate 8 is disposed on the backside of the liquid crystal display panel 1 and propagates light from the backlight source 4 to the pixel area 1a of the liquid crystal display panel 1. Therefore, the backlight source 4 is disposed adjacent the bottom edge of the optical guide plate 8.

Here, a detailed explanation will be made on backlighting. As shown in FIG. 1B, in a liquid crystal display device which is used, for example, in a notebook type personal computer and the like and which is required to have low power consumption and small size, one backlight source 4 is usually used and is disposed along an edge or a side of the optical guide plate 8 to illuminate the whole display area. Usually, luminance of light from the backlight source 4 becomes higher as the distance from the backlight source 4 becomes shorter, and the luminance becomes lower as the distance becomes longer.

However, distribution of luminance in the whole display area can be adjusted by using the optical guide plate 8. Luminance is adjusted by appropriately disposing printed light scattering portions 9 on the surface of the optical guide plate 8. That is, by making the number of the printed light scattering portions 9 smaller as the distance from the backlight source 4 becomes shorter, and larger as the distance from the backlight source 4 becomes farther. It is also possible to make the area of each of the printed light scattering portions 9 smaller as the distance from the backlight source becomes shorter, and larger as the distance from the backlight source 4 becomes farther. It is further possible to adjust the number and the area of the printed light scattering portions 9 according to the distance from the backlight source 4.

When the light 10 from the light source 4 is irradiated on the printed light scattering portion 9, the light 10 is randomly reflected and scattered by the printed light scattering portion 9 and is scattered onto the liquid crystal display panel 1 as shown by arrows 11 in FIG. 1B so that the pixel area 1a of the liquid crystal display panel is brightly illuminated. On the other hand, when the light from the backlight source 4 is irradiated onto a portion where the printed light scattering portion 9 is not disposed, the light is total internally reflected at the surface of the optical guide plate 8 toward inside of the optical guide plate 8. The reflected light is again total internally reflected at the surface of the optical guide plate 8 opposite to the liquid crystal display panel 1 and is used again as the light 10. Since quantity of light used for backlighting does not change as a whole, brightness of the displayed image does not change as a whole display area even when the distribution of luminance is changed.

In the present invention, it is also possible to use more than one backlight sources as long as such backlight sources can realize a luminance distribution which becomes lower as the distance from the gate signal input portion becomes larger.

Figure 3A:
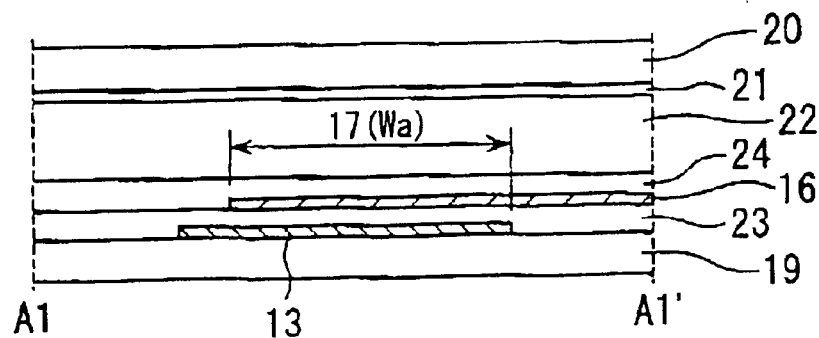
FIGS. 3A, 3B and 3C are enlarged partial cross sectional views taken along lines A1–A1', B1–B1' and C1–C1' of FIGS. 2A, 2B and 2C, respectively.
Figure 3B:
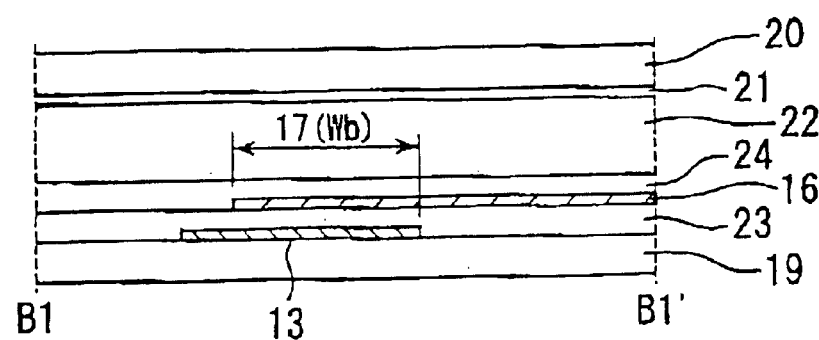
Figure 3C:
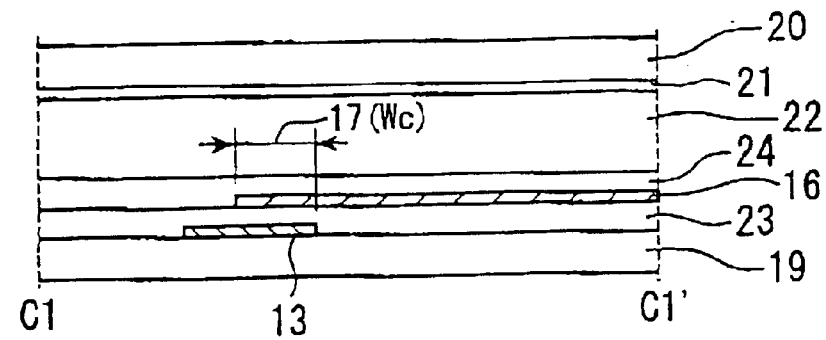

FIGS. 2A through 2C are partial enlarged views showing pixels respectively located in various portions on a liquid crystal display panel 1 of the liquid crystal display device of FIGS. 1A and 1B. FIG. 2A shows a pixel 5 on the side of the gate signal input portion 2 of the liquid crystal display panel 1 of FIG. 1A, FIG. 2B shows a pixel 6 located in a middle portion of the liquid crystal display panel 1, and FIG. 2C shows a pixel on the side opposite to the gate signal input portion 2. FIGS. 3A through 3C are enlarged cross sectional views taken along the lines A1–A1' of FIG. 2A, B1–B1' of FIG. 2B and C1–C1' of FIG. 2C, respectively.

As shown in FIGS. 2A through 2C and FIGS. 3A through 3C, on a glass substrate or a TFT substrate 19, gate signal lines 13 each having a predetermined pattern including gate electrode portions of TFT's 14, an interlayer insulating film 23, and source/drain regions made of amorphous silicon and the like are sequentially formed, and thereby TFT's 14 are formed. Then, drain signal lines 15 are formed such that the drain signal lines 15 are coupled to the drain regions of the TFT's 14, and pixel electrodes 16 are formed on the interlayer insulating film 23 and coupled to the respective source regions of the TFT's 14. Each of the pixel electrodes 16 is patterned such that the pixel electrode 16 partially overlaps with the gate signal line 13 coupled to the TFT 14 of the former adjacent stage. By overlapping the pixel electrode 16 with the gate signal line 13, an auxiliary capacitor portion 17, that is, a storage capacitor, is formed. The pixel electrodes 16 are covered by a passivation (PA) nitride film 24. Although not shown in the drawing, the PA nitride film 24 is patterned into predetermined necessary patterns.

Also, on a glass substrate or an opposing substrate 20 which is disposed opposite to the glass substrate 19, there is formed an opposing electrode 21, and a gap portion between the opposing electrode 21 and the PA nitride film 24 on the pixel electrodes 16 and the like is filled with liquid crystal 22.

Figure 4:
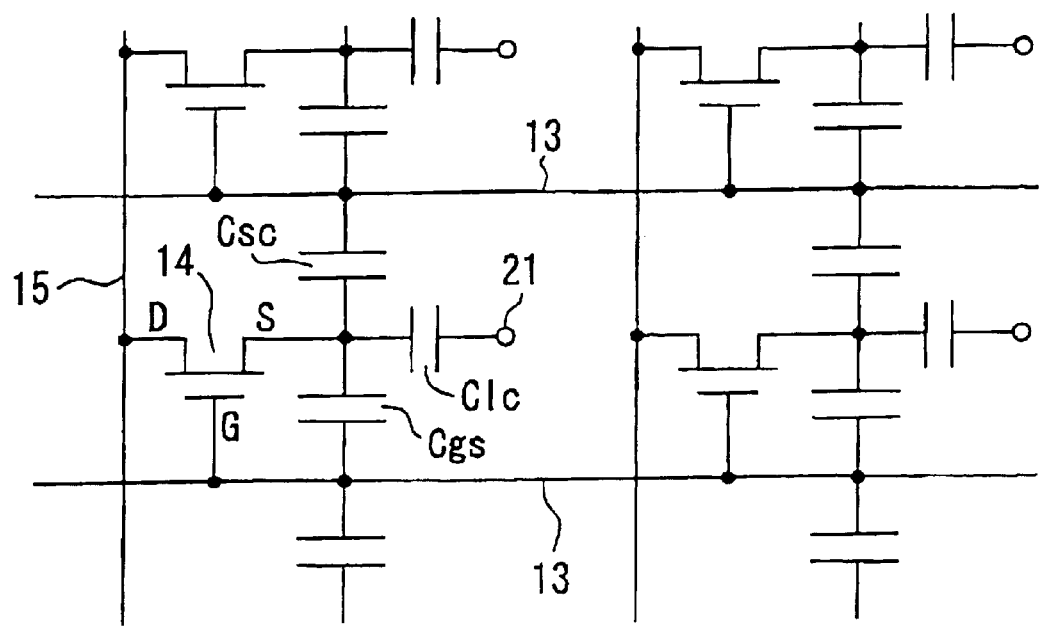
FIG. 4 is a circuit diagram showing an equivalent circuit of a pixel portion of a liquid crystal display panel.

An equivalent circuit of a portion of a pixel area of a liquid crystal display panel 1 according to the present invention is also represented by the circuit of FIG. 4. As shown in FIG. 4, an equivalent circuit of each pixel comprises a TFT 14 whose drain is coupled to a drain signal line 15 and whose gate is coupled to a gate signal line 13, a gate-source capacitance Cgs, a storage capacitance Csc, and a liquid crystal (LC) capacitance Clc. The storage capacitance Csc exists between the source electrode of the TFT 14 and an adjacent gate signal line 13. The LC capacitance Clc exists between the source electrode of the TFT 14, i.e., a display electrode 16, and an opposing electrode 21. Especially, as mentioned before, the storage capacitance Csc is formed by the overlap of the pixel electrode 16 with the gate signal line 13.

As shown in FIGS. 2A through 2C and FIGS. 3A through 3C, as the distance from the gate signal input portion 2 becomes larger, that is, as the location shifts from the portion A to the portion C, the width of the gate signal line 13 becomes narrower such that the area of the overlap between the gate signal line 13 and the pixel electrode 16 becomes smaller. Therefore, the storage capacitance Csc becomes gradually smaller from the portion A toward the portion C. In this case, the size and shape of each pixel electrode 16 may be constant.

By using the above-mentioned structure, as the distance from the gate pulse input portion 2 becomes larger, the feedthrough voltage components become smaller due to the increase in the TFT leakage caused by the gate pulse blunting. However, since the storage capacitance Csc becomes smaller as the distance from the gate signal input portion 2 becomes larger, variation of the feedthrough voltage components can be compensated by the variation of the storage capacitance Csc.

That is, assuming that the feedthrough voltage component and the storage capacitance at the portion A of FIG. 1A are Vfdin and Csc, respectively, and that the feedthrough voltage component and the storage capacitance at the portion C of FIG. 1A are Vfdout and Csc', respectively, the feedthrough voltage components Vfdin and Vfdout are respectively represented by the following formulas (4) and (5).

$$Vfdin = [Cgs/(Clc+Csc+Cgs)] * \Delta Vg \quad (4)$$

$$Vfdout = (Cgs * \Delta Vg - \int Ids\, dt)/(Clc+Csc'+Cgs) \quad (5)$$

In these formulas (4) and (5), if the storage capacitance Csc and Csc' are the same, Vfdin>Vfdout. Therefore, by determining the values of Csc and Csc' such that the values Vfdin and Vfdout become equal to each other, it is possible to uniformalize the feedthrough voltage components both at the portion A and the portion C.

The reason why the feedthrough voltage components can be uniformalized by this structure will be described with reference to signal waveform diagrams. FIGS. 5A through 5D are also applicable in this case.

Figure 5A:
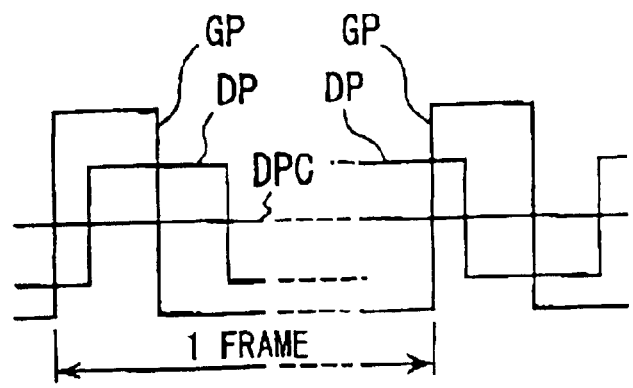
FIGS. 5A, 5B, 5C and 5D are waveform diagrams showing signal waveforms at various portions of a liquid crystal display panel, used for explaining on variation of feedthrough voltage component caused by blunting of a gate signal pulse.
Figure 5B:
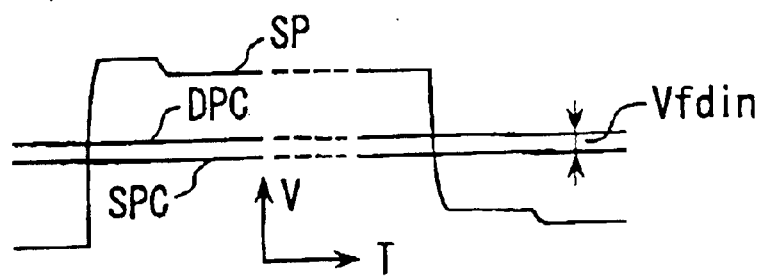
Figure 5C:
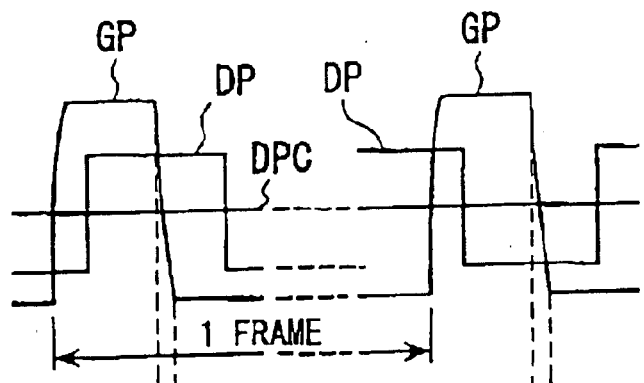
Figure 5D:
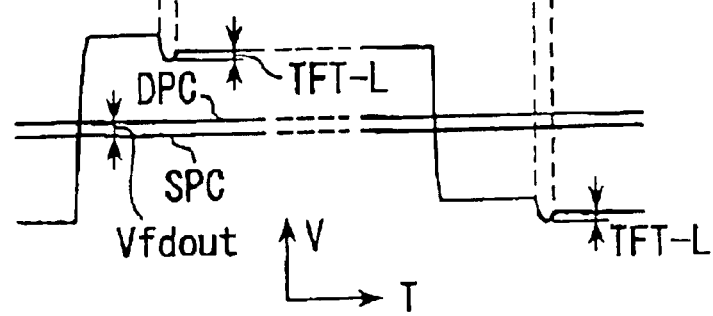

That is, FIGS. 5A and 5B show signal waveforms at the portion A of FIG. 1A, and FIGS. 5C and 5D show signal waveforms at the portion C of FIG. 1A. In each of FIG. 5A and FIG. 5C, waveforms show signal waveforms of gate pulses GP and drain pulses DP inputted respectively to gate signal lines and drain signal lines. Also, in each of FIGS. 5B and 5D, a waveform shows a source pulse SP actually written into a pixel electrode. As shown in FIG. 5B, at the portion A, the source pulse SP is influenced by the falling down of the gate pulse GP, and the potential of the source pulse center SPC becomes lower than the drain pulse center DPC by the amount Vfdin. On the other hand, as shown in FIG. 5D, at the portion C, because of the TFT leakage, the influence by the falling down of the gate pulse GP becomes small. Therefore, as mentioned above, by making the storage capacitance on the side opposite to the input side of the gate pulse GP smaller than the storage capacitance on the input side of the gate pulse GP taking the amount of the TFT leakage into consideration, it is possible to reduce the influence by the falling down of the gate pulse GP and to equalize the values of Vfdin and Vfdout with each other.

In practice, simulation and/or experiment are previously performed and evaluates the value of $$\int Ids\, dt.$$

Then, variation of storage capacitance is obtained and the storage capacitance is gradually or stepwise decreased as the distance from the side of the gate pulse input portion 2 becomes large. Here, the relationship between the storage capacitances Csc and Csc' is shown below.

$$Csc' = [(Cgs * \Delta Vg - \int Ids\, dt)(Clc+Csc+Cgs)]/(Cgs * \Delta Vg) - (Clc-Cgs) \quad (6)$$

By this formula, the storage capacitance Csc' at the portion C is obtained, and the storage capacitor is gradually or stepwise decreased from Csc to Csc' as the location changes from the gate signal input portion 2 to the opposite side of the gate signal input portion 2.

In practice, as shown in FIGS. 2A through 2C, while keeping the shape and size of the pixel electrode 16 constant, an overlapped area between the pixel electrode 16 and the gate signal line 13 of the former stage is gradually reduced to gradually decrease the storage capacitance, as the location changes from the gate signal input portion 2 to the opposite end.

By using such structure, the feedthrough voltage components within the image display area are uniformalized, and it is possible to suppress occurrence of image persistence, stain and the like within the whole image display area of the liquid crystal display panel, and thereby to improve a quality of display.

Figure 7A:
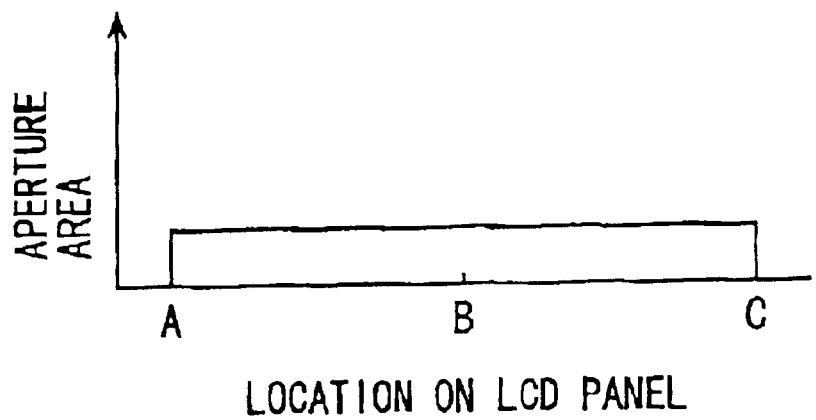
FIGS. 7A, 7B and 7C are graphs showing distributions of aperture areas, backlight luminance and image display luminance, respectively, with respect to locations on a conventional liquid crystal display panel.
Figure 7B:
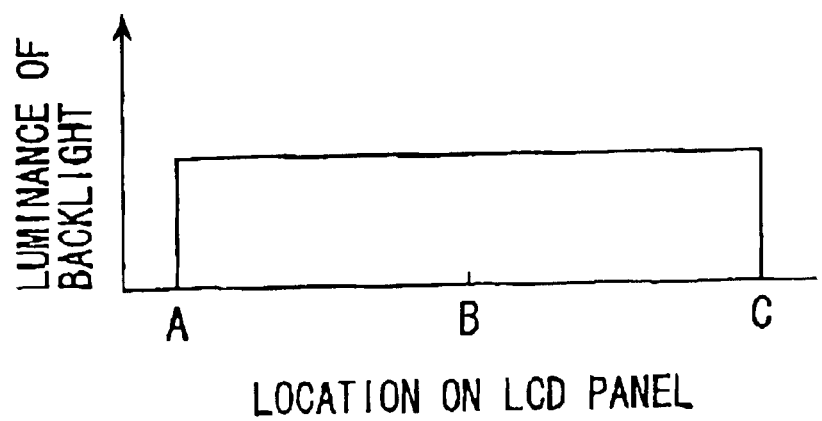
Figure 7C:
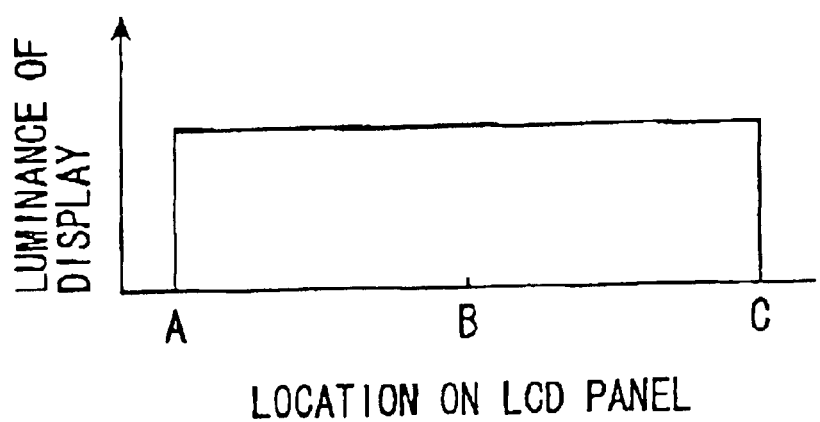

In the conventional liquid crystal display device disclosed in Japanese patent laid-open No. 10-39328, the width of each gate signal line is constant. Therefore, as shown in FIGS. 7A through 7C, the area of each aperture portion of a pixel is constant throughout all pixels, and backlight illuminating such liquid crystal display panel has uniform luminance throughout the image display area to obtain uniform image luminance in whole image display area.

On the other hand, as shown in FIGS. 2A through 2C, in the present invention, the width of the gate signal line 13 becomes narrower as the distance from the gate signal input portion 2 becomes large. Therefore, an area of each pixel through which light used for image display in a liquid crystal display device passes, that is, an area of an opening portion or an aperture 18 of each pixel becomes large when compared with the above-mentioned conventional liquid crystal display device. The area of the opening portion 18 of each pixel is determined by a shading film of a color filter not shown in the drawing, a gate signal line made of metal film such as Cr, Al and the like, and so on. Therefore, by making the width of each gate signal line narrow, the area of the opening portion 18 becomes large.

Figure 6A:
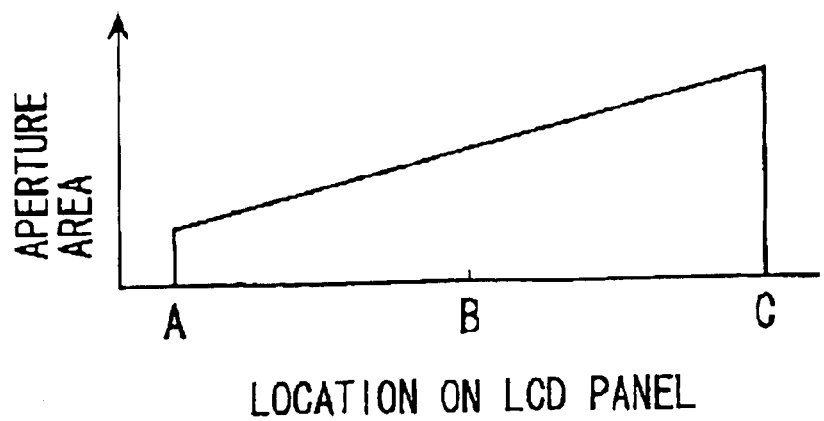
FIGS. 6A, 6B and 6C are graphs showing distributions of aperture areas, backlight luminance and image display luminance, respectively, with respect to locations on a liquid crystal display panel according to the present invention.

In the liquid crystal display panel according to the present invention, as shown in FIG. 6A, the area of the opening portion 18 is the same as that of the conventional liquid crystal display panel at the gate signal input portion 2. However, the area of the opening portion 18 becomes larger as the distance from the gate signal input portion 2 becomes larger. Therefore, the area of the opening portion 2 is much larger than that of the conventional liquid crystal display panel at the portion opposite to the gate signal input portion 2, and an aperture ratio is larger than that of the conventional liquid crystal display panel throughout the image display area.

Figure 6B:
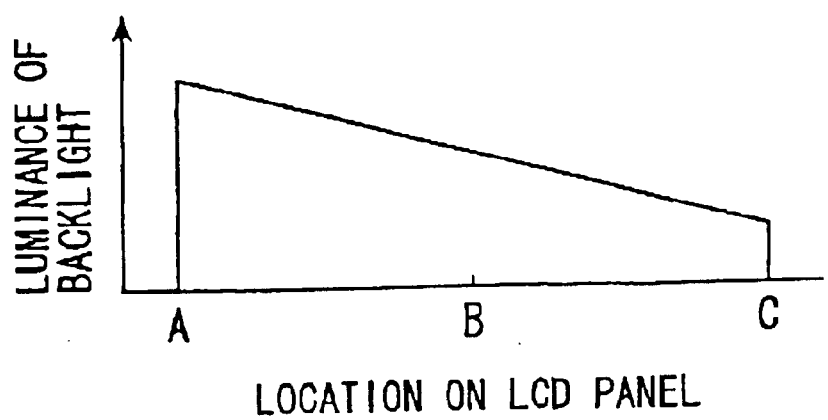
Figure 6C:
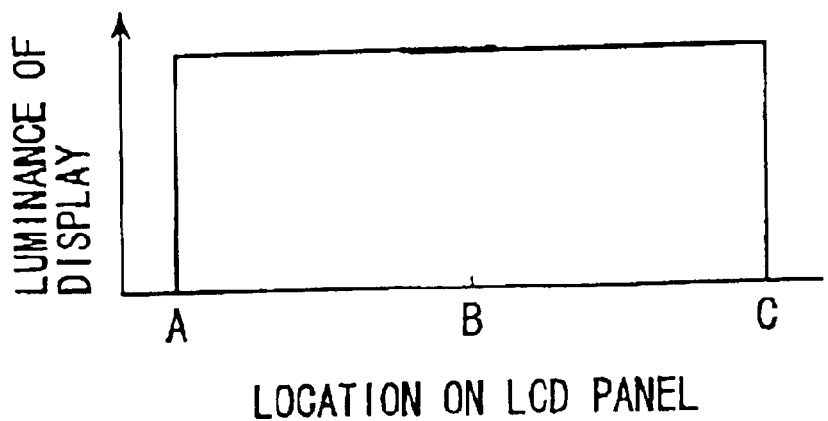

Therefore, the distribution of luminance of backlighting used in the present invention is varied depending on the distance from the gate signal input portion 2. That is, as shown in FIG. 6B, the luminance of backlighting is higher on the side of the gate signal input portion 2 and lower on the side opposite to the gate signal input portion 2. The luminance of backlighting becomes lower as the distance from the gate signal input portion 2 becomes larger. In order to adjust such distribution of luminance of backlighting, for example, the number and/or the area of the printed light scattering portions 9 is made smaller as the distance from the backlight source 4 becomes shorter and as the distance from the gate signal input portion 2 becomes larger, and is made larger as the distance from the backlight source 4 becomes farther and as the distance from the gate signal input portion 2 becomes shorter. ( ) Thereby, as shown in FIG. 6C, the luminance of the displayed image becomes uniform throughout the image display area, and becomes higher than that of the conventional liquid crystal display panel.

Thus, according to the present invention, the area of the opening portions is increased as a whole image display area, and the distribution of luminance of the displayed image is compensated by the distribution of luminance of backlighting. As a result, it is possible to obtain a liquid crystal display device having a uniform luminance distribution and a high image luminance.

Second Embodiment

Now, with reference to FIGS. 8A through 8C and FIGS. 9A through 9C, an liquid crystal display device according to a second embodiment will be described.

Figure 8A:
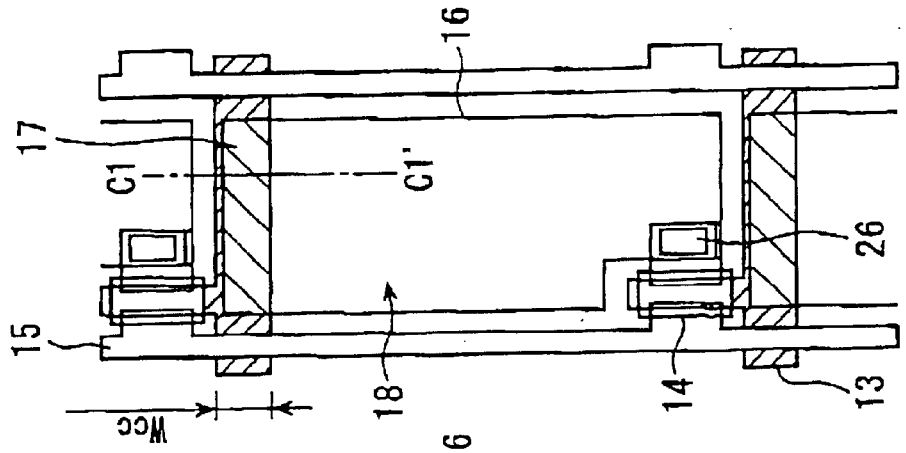
FIGS. 8A, 8B and 8C are enlarged plan views respectively showing, as a second embodiment of the present invention, detailed structures of portions A, B and C of a liquid crystal display panel in the liquid crystal display device of FIG. 1A.
Figure 8B:
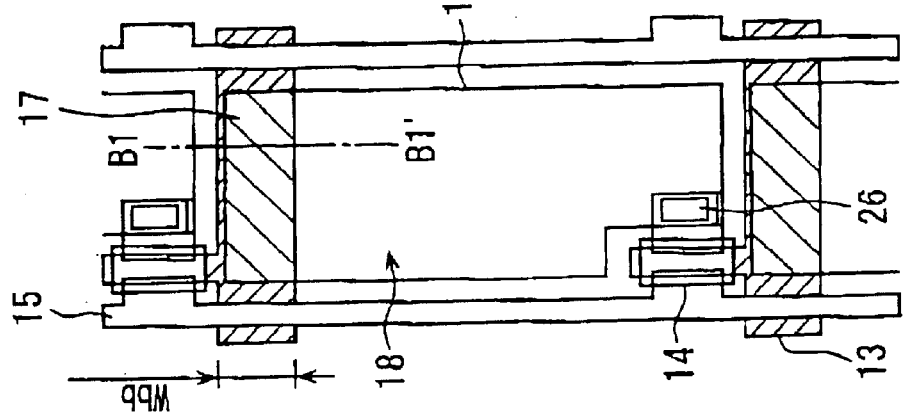
Figure 8C:
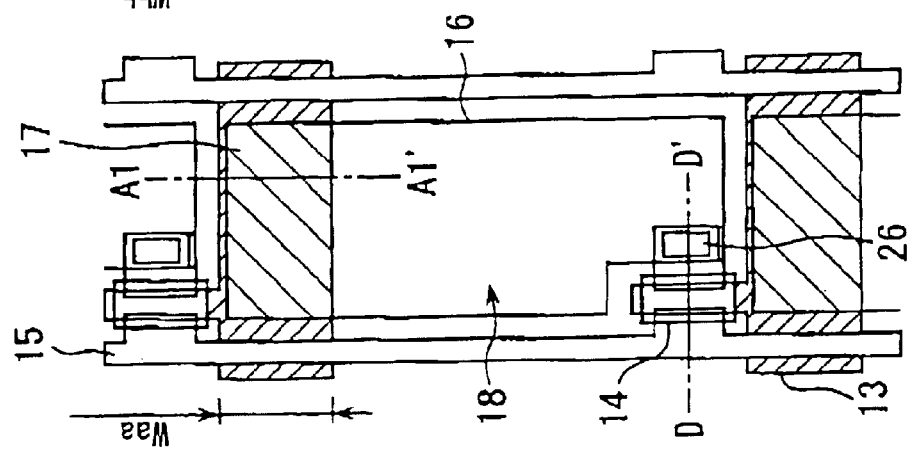

FIGS. 8A through 8C are partial enlarged views showing pixels respectively located in various portions on a liquid crystal display panel 1 of the liquid crystal display device of FIGS. 1A and 1B. FIG. 8A shows a pixel 5 on the side of the gate signal input portion 2 of the liquid crystal display panel 1 of FIG. 1A, FIG. 8B shows a pixel 6 located in a middle portion of the liquid crystal display panel 1, and FIG. 8C shows a pixel on the side opposite to the gate signal input portion 2.

Figure 9A:
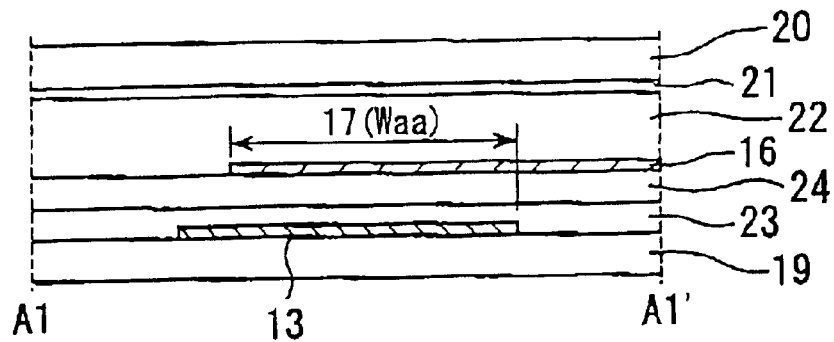
FIGS. 9A, 9B and 9C are enlarged partial cross sectional views taken along lines A1–A1', B1–B1' and C1–C1' of FIGS. 8A, 8B and 8C, respectively.
Figure 9B:
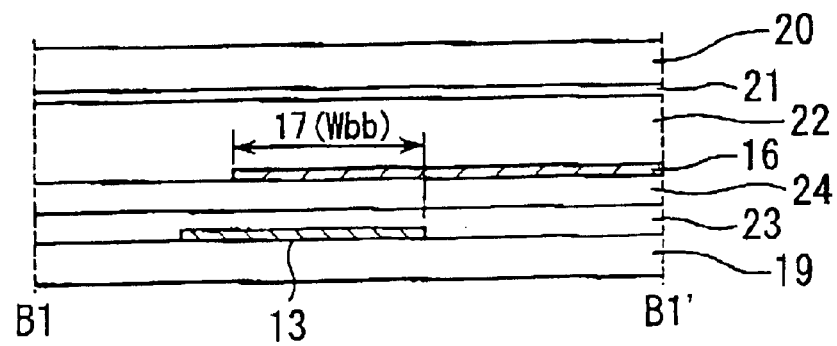
Figure 9C:
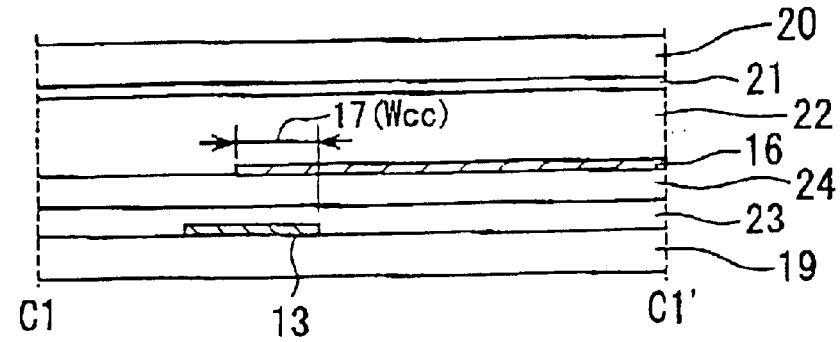

FIGS. 9A through 9C are enlarged cross sectional views taken along the lines A1–A1' of FIG. 8A, B1–B1' of FIG. B and C1–C1' of FIG. 8C, respectively.

As shown in FIGS. 8A through 8C and FIGS. 9A through 9C, on a glass substrate 19, gate signal lines 13 each having a predetermined pattern including gate electrode portions of TFT's 14 are formed. Then, an interlayer insulating film 23 covering the gate signal lines 13 and the like, and source/drain regions made of amorphous silicon and the like are sequentially formed, thereby TFT's 14 are formed. Then, drain signal lines 15 are formed such that the drain signal lines 15 are coupled to the drain regions, and a PA nitride film 24 is formed to cover the drain signal lines 15 and the like. Pixel electrodes 16 are then formed on the passivation (PA) nitride film 24 and coupled to the respective source regions 25 via contact holes 26. Each of the pixel electrodes 16 is patterned such that the pixel electrode 16 partially overlaps with the gate signal line 13 coupled to the TFT's 14 of the former adjacent stage. By overlapping the pixel electrode 16 with the gate signal line 13, a storage capacitor or an auxiliary capacitor portion 17 is constituted.

Also, on a glass substrate 20 disposed opposite to the glass substrate 19, there is formed an opposing electrode 21, and a gap portion between the opposing electrode 21 and the pixel electrodes 16 is filled with liquid crystal 22.

Figure 10A:
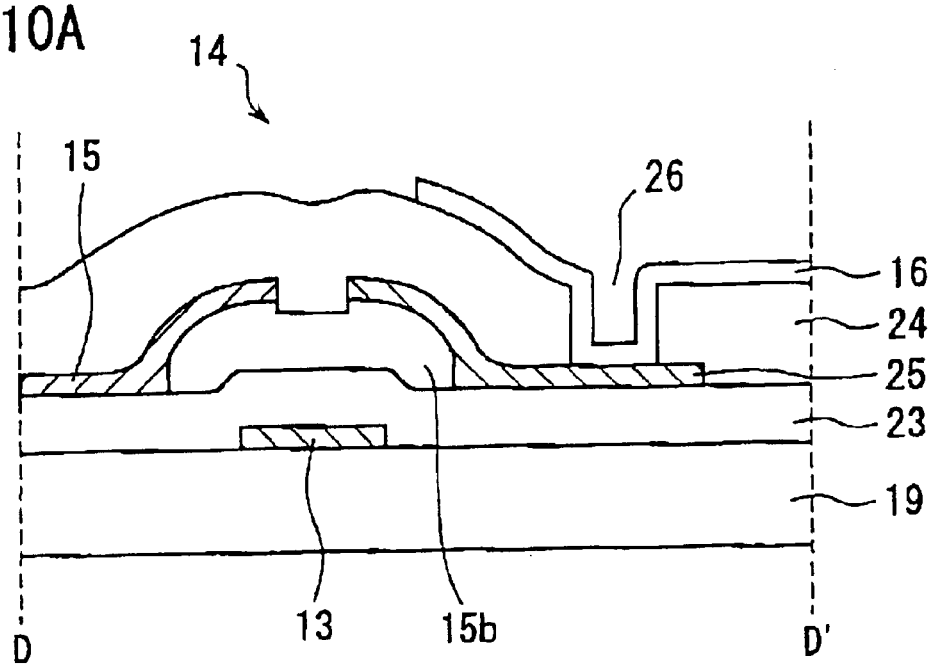
FIG. 10A is a partial cross sectional view showing a detailed structure around a TFT portion taken along a line D–D' in FIG. 8A.
Figure 10B:
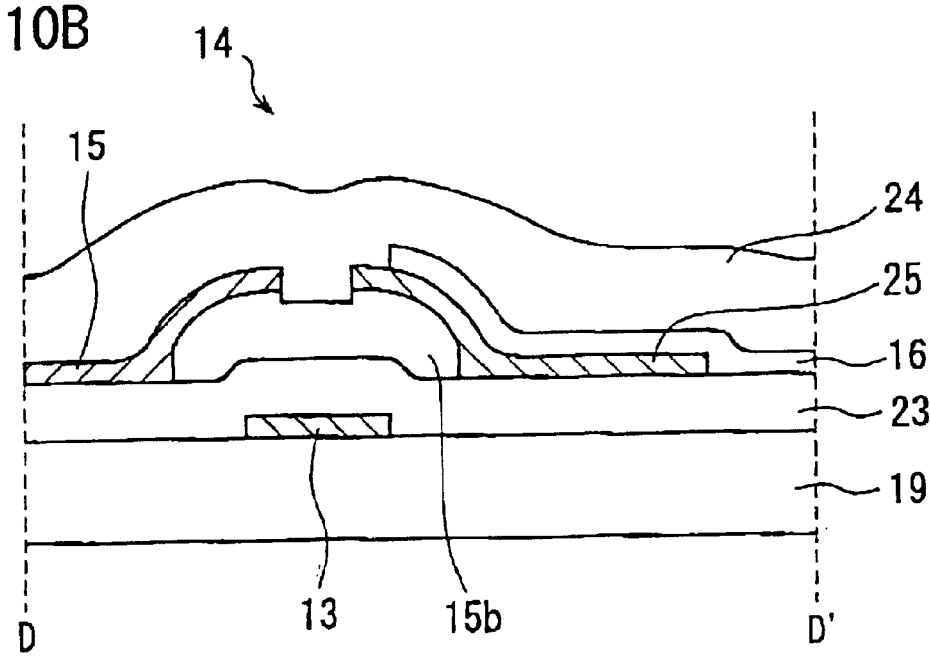
FIG. 10B is a partial cross sectional view showing a detailed structure around a TFT portion taken along a line D–D' in FIG. 2A.

FIG. 10A shows a partial cross section taken on line D–D' of FIG. 8A. As shown in FIG. 10A, in this structure, the drain signal line 15 and the source regions 25 are isolated from the pixel electrode 16 via the PA nitride film 24. However, by using this structure, it is possible to simplify a manufacturing process of the liquid crystal display device, because additional process steps are not required in other portions of the liquid crystal display device not shown in the drawing. FIG. 10B shows a partial cross section taken on line D–D' of FIG. 2A.

An equivalent circuit of a portion of a pixel area of a liquid crystal display panel 1 having this structure is also represented by the circuit of FIG. 4. As shown in FIG. 4, an equivalent circuit of each pixel comprises a TFT 14 whose drain is coupled to a drain signal line 15 and whose gate is coupled to a gate signal line 13, a gate-source capacitance Cgs, a storage capacitance Csc, and a liquid crystal (LC) capacitance Clc. The storage capacitance Csc exists between the source electrode of the TFT 14 and an adjacent gate signal line 13. The LC capacitance Clc exists between the source electrode of the TFT 14, i.e., a display electrode, and an opposing electrode.

As also shown in FIGS. 9A through 9C, the storage capacitance Csc is formed by the capacitive coupling between the pixel electrode 16 and the gate signal line 13 via the interlayer insulating film 23 and PA nitride film 24.

The storage capacitance Csc in this structure becomes slightly smaller than that of the first embodiment, because the gate signal line 13 and the pixel electrode 16 are capacitively coupled via the PA nitride film 24 as well as the interlayer insulating film 23. In order to compensate for reduction of the capacitance, it is necessary to make the area of the auxiliary capacitor portion 17 shown in FIGS. 8A through 8C and FIGS. 9A through 9C slightly larger than that of the first embodiment, and the width of the gate signal line 13 becomes relatively wide on the side of the gate signal input portion 2 to obtain a predetermined capacitance. However, in the present invention, the width of the gate signal line 13 can be narrower as the distance from the gate signal input portion 2 becomes larger while keeping the size of the pixel electrode 16 constant. Therefore, the area of the overlapped portion can be smaller as the distance from the gate signal input portion 2 becomes larger.

In this way, an area of each pixel through which light used for image display in a liquid crystal display device passes, that is, an area of an opening portion or an aperture 18 can be increased. Therefore, it is possible to obtain similar advantageous effects as those of the first embodiment.

Especially, when compared with the first embodiment, in the second embodiment, since the width of the gate signal line 13 is large at the input end of the gate signal line 13, influence of falling down of gate pulses is large. Also, since the storage capacitance is formed by capacitively coupling the gate signal line 13 and the pixel electrode 16 via the PA nitride film 24 as well as the interlayer insulating film 23, an area of each auxiliary capacitor 17 varies largely to change the capacitance of the storage capacitance. That is, the width of the gate signal line becomes much narrower than in the case of the first embodiment as the distance from the gate signal input portion 2 becomes larger. Therefore, effect of enlarging the area of the opening portion 18 can be expected to become large as the distance from the gate signal input portion 2 becomes large.

Third Embodiment

Figure 11A:
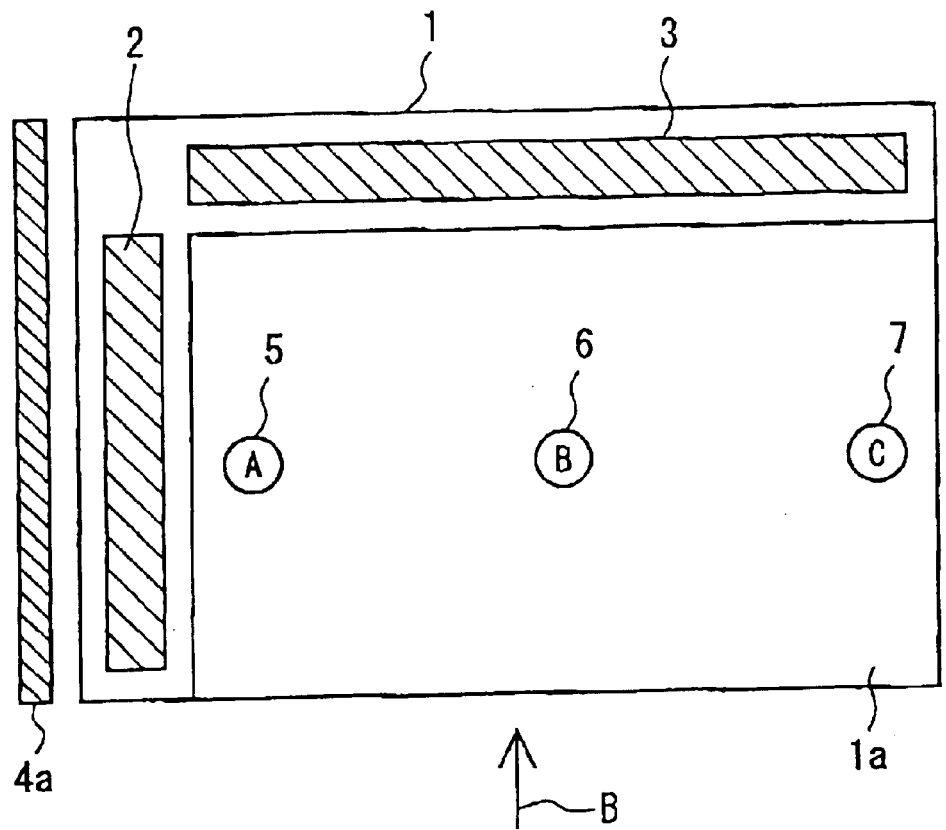
FIG. 11A is a plan view showing a liquid crystal display device according to a third embodiment of the present invention.
Figure 11B:
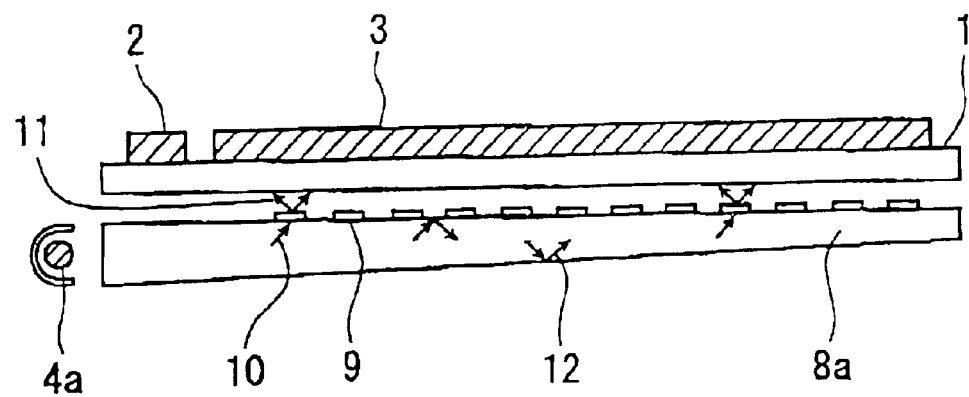
FIG. 11B is a side view of the liquid crystal display device shown in FIG. 11A, as seen from an arrow B in FIG. 11A.
Figure 12:
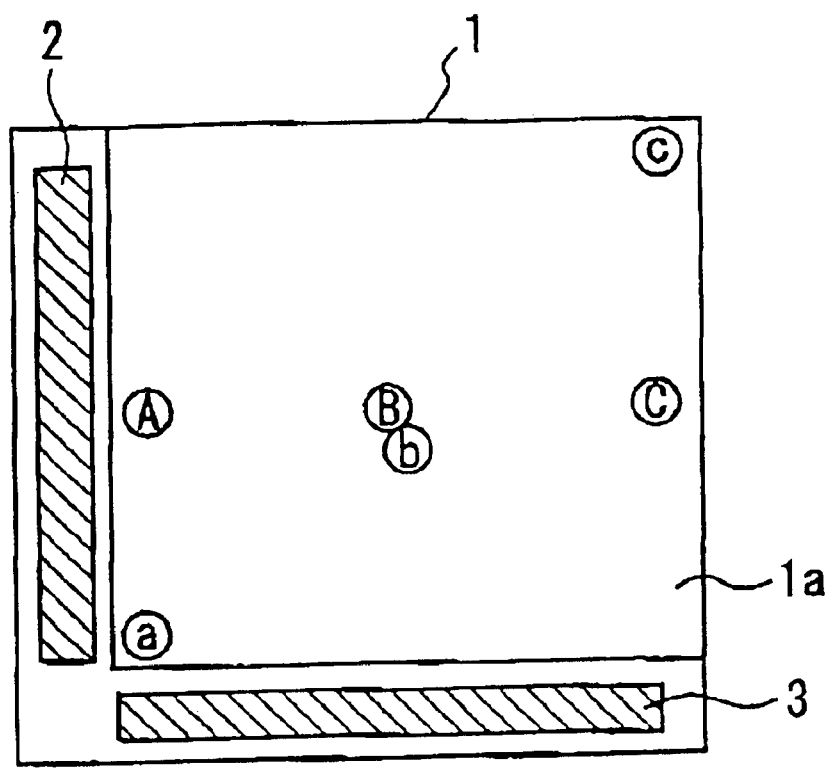
FIG. 12 is a schematic plan view showing a conventional liquid crystal display device.
Figure 13A:
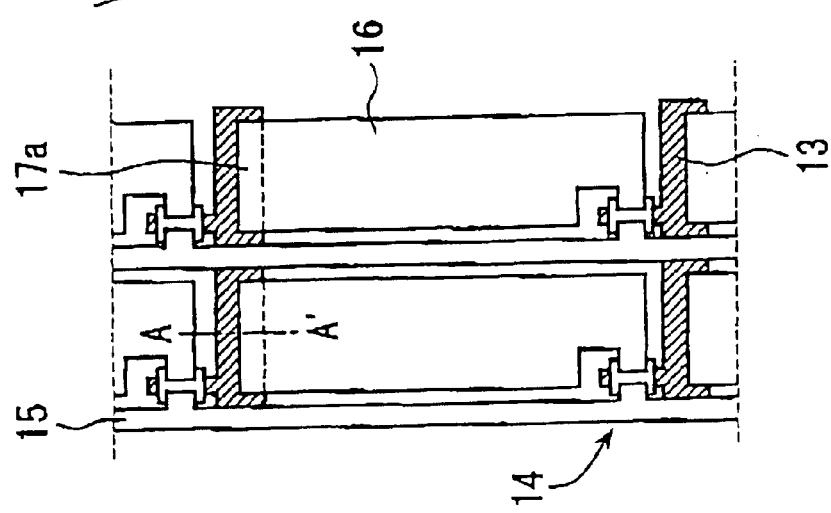
FIGS. 13A, 13B and 13C are enlarged plan views respectively showing detailed structures of portions A, B and C of a liquid crystal display panel in a conventional liquid crystal display device.
Figure 13B:
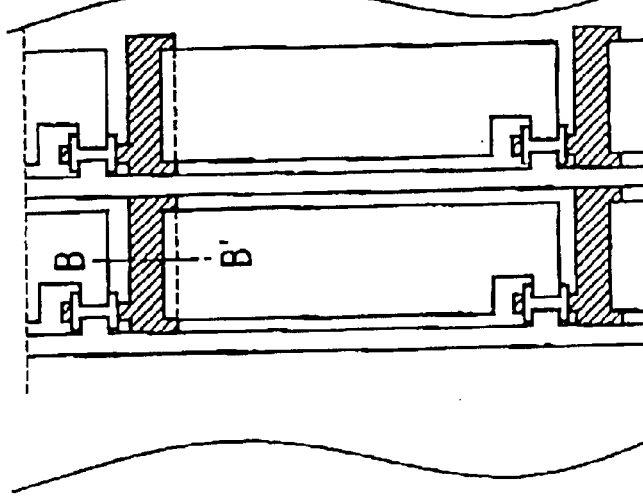
Figure 13C:
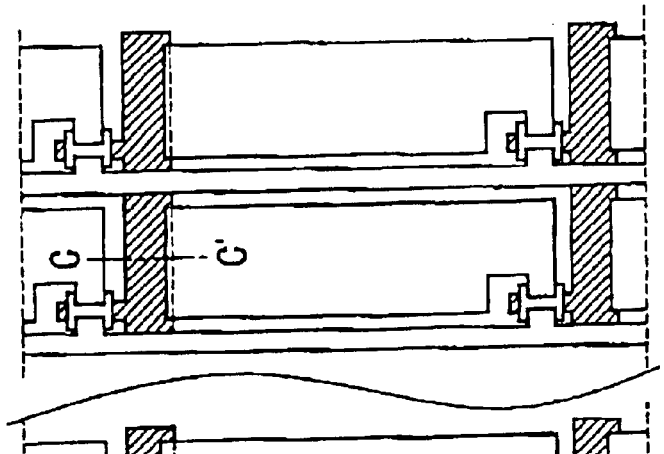
Figure 14A:
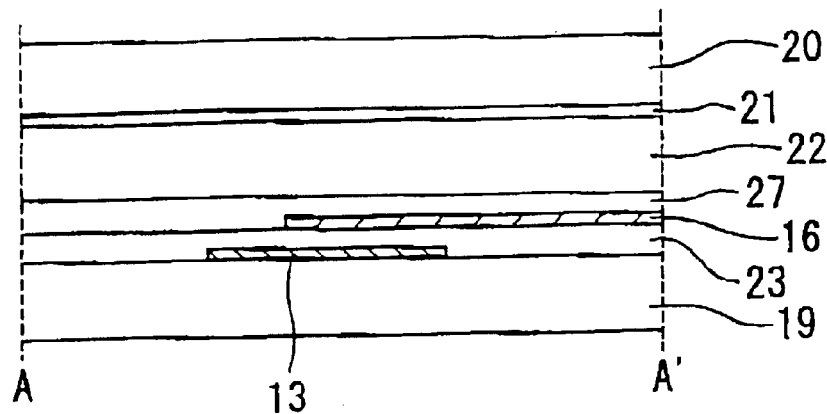
FIGS. 14A, 14B and 14C are enlarged partial cross sectional views taken along lines A–A', B–B' and C–C' of FIGS. 13A, 13B and 13C, respectively.
Figure 14B:
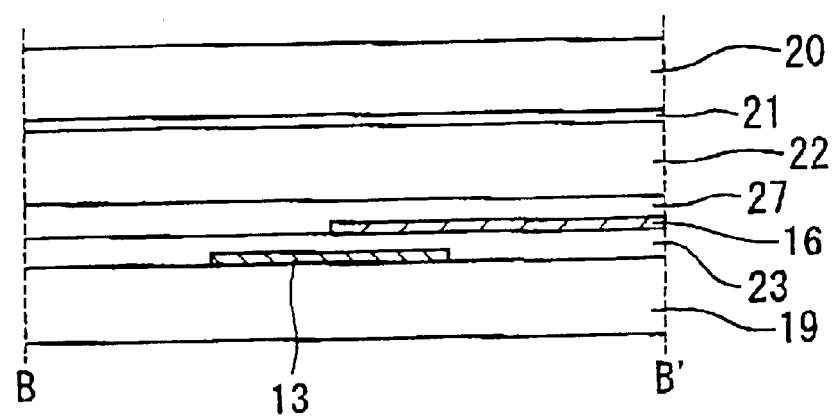
Figure 14C:
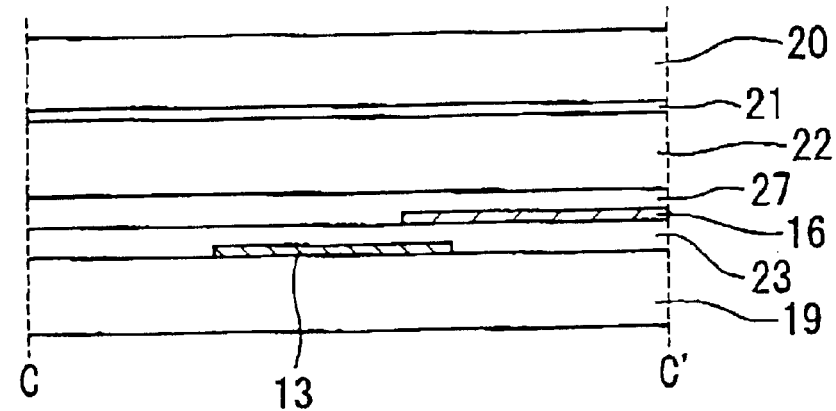
Figure 15:
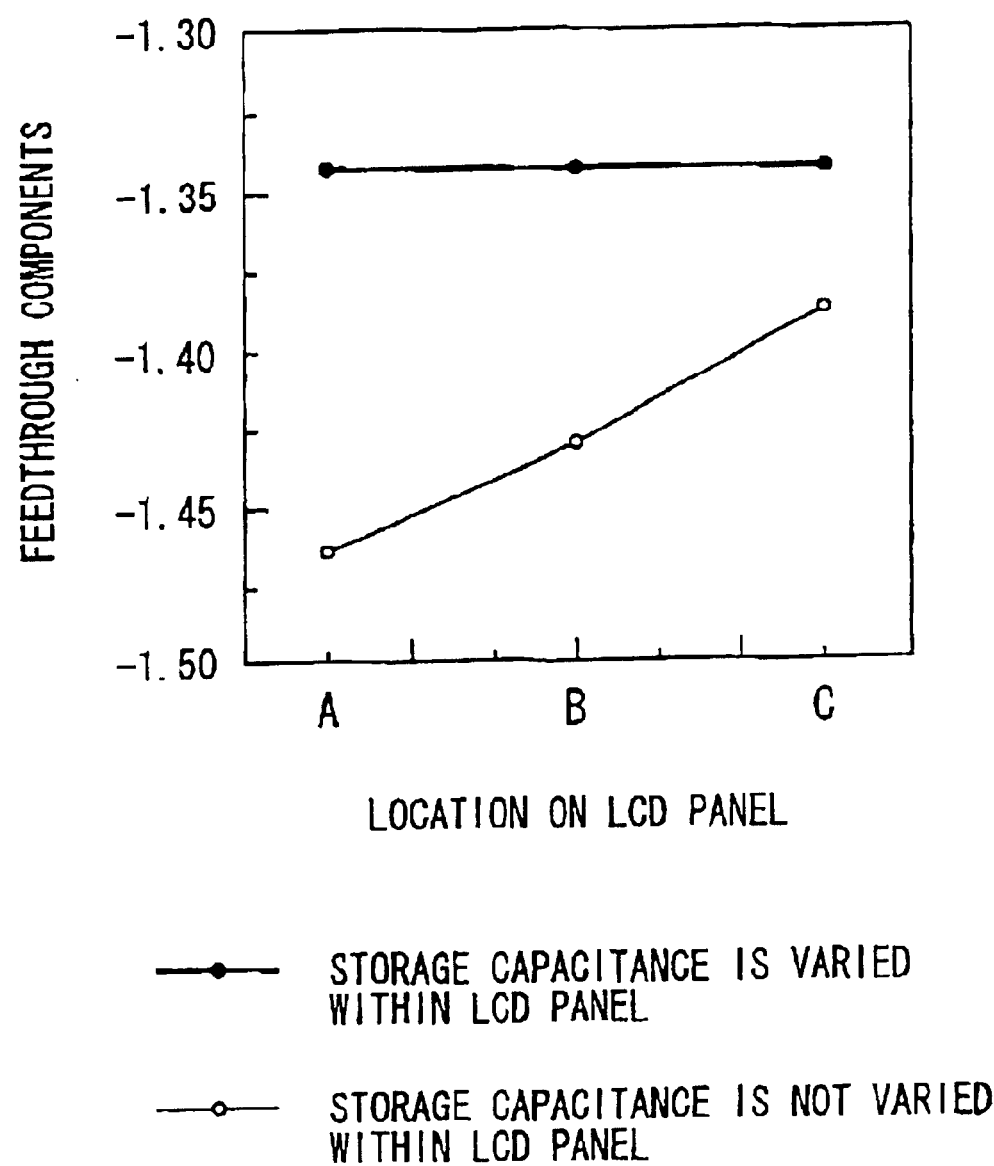
FIG. 15 is a graph showing variations of feedthrough voltage components of various liquid crystal display panels in a horizontal direction.

FIG. 11A is a schematic plan view showing a whole structure of the liquid crystal display device according to a third embodiment of the present invention and showing a liquid crystal display panel 1 and a backlight source 4a. FIG. 11B is a cross sectional view of the liquid crystal display device of FIG. 11A taken from the bottom side thereof, i.e., taken in the direction of an arrow B in FIG. 11A.

The liquid crystal display panel 1 comprises a pixel area 1a where a plurality of pixels are disposed in a matrix. Along the left side and the upper side of the liquid crystal display panel 1, there are disposed a gate signal input portion 2 and a drain signal input portion or a signal input portion 3, respectively. The gate signal input portion 2 comprises, for example, a plurality of gate signal input pads for supplying gate drive pulses to the pixel area 1a. Also, the drain signal input portion 3 comprises, for example, a plurality of drain signal input pads for inputting drain drive pulses to the panel area 1a.

The backlight source 4a has, for example, an elongated shape and is disposed on the left side in FIG. 11A, that is, on the side of the gate signal input portion 2, of the liquid crystal display panel 1. As shown in FIG. 11B, an optical guide plate 8a is disposed on the backside of the liquid crystal display panel 1 and propagates light from the backlight source 4a to the pixel area 1a of the liquid crystal display panel 1. Therefore, the backlight source 4a is disposed adjacent a side edge of the optical guide plate 8a.

Usually, luminance of light from the backlight source 4a becomes higher as the distance from the backlight source 4a becomes shorter, and the luminance becomes lower as the distance becomes longer. However, distribution of luminance in the whole display area can be adjusted by using the optical guide plate 8a. Luminance is adjusted by disposing printed light scattering portions 9 on the surface of the optical guide plate 8a, that is, by making the number of the printed light scattering portions 9 smaller as the distance from the backlight source 4a is shorter, and larger as the distance from the backlight source 4a is larger. As shown in FIG. 11B, when the backlight source 4a is disposed on the side of the gate signal input portion 2, it is possible to dispose the printed light scattering portions 9 relatively uniformly on the surface of the optical guide plate 8a to obtain luminance distribution shown in FIG. 6B. Therefore, design of arrangement and the like of the printed light scattering portions 9 of the optical guide plate 8a can be simplified.

In summary, in the liquid crystal display device according to the present invention, the width of each gate signal line becomes narrower as the distance from the gate signal input portion becomes large and, therefore, it is possible to enlarge an area of a portion of each pixel through which light used for image display passes, that is, an area of an opening portion of each pixel. Accordingly, luminance of backlighting is made higher at the gate signal input end portion and lower at the portion opposite to the gate signal input end portion to compensate for uneven distribution of the area of each opening portion. Therefore, it is possible to realize a liquid crystal display device having a high and uniform image luminance.

Also, according to the present invention, it is possible to uniformalize feedthrough voltage components in an image display area and to suppress image persistence, stain and the like within whole image display area. As a result, it becomes possible to improve image display quality.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are to be included within the scope of the present invention. Therefore, it is intended that this invention encompasses all of the variations and modifications as fall within the scope of the appended claims.

What is claimed is:

1. A liquid crystal display device having a liquid crystal display panel, said liquid crystal display panel comprising:
   a plurality of pixels which are disposed in matrix having rows and columns and each of which has at least a thin film transistor (TFT) and a pixel electrode, each said pixel having an opening defining an aperture ratio;
   a plurality of gate signal lines which extend from a gate signal input portion disposed along a side of said liquid crystal display panel and each of which is coupled with said TFT's in a row of said matrix;
   auxiliary capacitor portions each additionally coupled with a pixel electrode of one of said pixels, the width of said gate signal line becomes narrower and thereby capacitance of said auxiliary capacitor portions becomes smaller as the distance from said gate signal input portion becomes larger, and
   the aperture ratio increasing as the capacitance of said auxiliary capacitor portions becomes smaller;
   capacitance of each of said auxiliary capacitor portions being determined by an area of an opposing portion between a pixel electrode of a pixel and a gate signal line coupled with an adjacent pixel via an interlayer insulating film and a nitride film between said pixel electrode and said gate signal line.

2. A liquid crystal display device as set forth in claim 1, wherein an area of an aperture portion of said, pixel becomes larger as the distance from said gate signal input portion becomes larger.

3. A liquid crystal display device as set forth in claim 1, further comprising a backlight portion for illuminating said liquid crystal display panel from the backside thereof, wherein said backlight portion comprises at least one elongated backlight source and a light guide plate which is disposed on the backside of said liquid crystal display panel and which propagates light from said backlight source toward said liquid crystal display panel, said light guide plate comprising printed light scattering portions disposed on a surface thereof for adjusting a distribution of luminance of backlighting.

4. A liquid crystal display device as set forth in claim 1, further comprising a backlight portion for illuminating said liquid crystal display panel from the backside thereof, wherein said backlight portion comprises an elongated backlight source disposed along the side of said liquid crystal display panel where said gate signal input portion is disposed.

5. A liquid crystal display device as set forth in claim 1, wherein said pixels each correspond to an equivalent circuit comprising:
   a drain coupled to a drain signal line, said drain signal line having a gate coupled to said gate signal line;
   a source corresponding to said pixel electrode coupled to an opposing electrode disposed on a substrate, said pixel electrode having a gate coupled to said gate signal line, a gap portion between said opposing electrode and said nitride film between said pixel electrode and said gate signal line being filled with liquid crystal;
   said pixel electrode and said gate having a corresponding gate source capacitance, Cgs,
   said pixel electrode and said opposing electrode having a corresponding liquid crystal capacitance, Clc,
   said pixel electrode overlapping said gate signal line forming a corresponding storage capacitance, Csc,
   differences in amplitude of the gate signals defining a gate pulse amplitude, ΔVg,
   a total TFT leakage current flowing from said pixel electrode to said drain signal line until said TFT current is completely dissipated being defined as ∫Ids dt;
   and variation of storage capacitance, Csc, with distance from said gate signal line being defined as Csc', wherein:

$Csc'=[\{(Cgs)(\Delta Vg)-\int ids\ dt\}\{Clc+Csc+Cgs\}]/\{(Cgs)(\Delta Vg)\}-(Clc-Cgs)$.

6. A liquid crystal display device comprising:
   (a) a liquid crystal display panel having:
      a plurality of pixels which are disposed on a TFT substrate in a matrix having rows and columns and each of which has at least a thin film transistor (TFT) and a pixel electrode, each said pixel having an opening defining an aperture ratio;
      a plurality of gate signal lines which extend on said TFT substrate from a gate signal input portion disposed along a side of said liquid crystal display panel and each of which is coupled with said TFT's in a row of said matrix;
      auxiliary capacitor portions each additionally coupled with a pixel electrode of one of said pixel, the width of said gate signal line becoming narrower and thereby capacitance of said auxiliary capacitor portions becoming smaller as the distance from said gate signal input portion becomes larger; and
      an opposing substrate which opposes to said TFT substrate while keeping a small gap therebetween, said small gap being filled with liquid crystal; and
   (b) a backlight portion for illuminating said liquid crystal display panel from the backside thereof, luminance of backlight by said backlight portion becomes lower as the distance from said gate signal input portion becomes larger, the aperture ratio increasing as the capacitance of said auxiliary capacitor portions becomes smaller, capacitance of each of said auxiliary capacitor portions being determined by an area of an opposing portion between a pixel electrode of a pixel and a gate signal line coupled with an adjacent pixel via an interlayer insulating film and a nitride film between said pixel electrode and said gate signal line.

7. A liquid crystal display device as set forth in claim 6, wherein capacitance of each of said auxiliary capacitor portions is determined by an area of an opposing portion between a pixel electrode of a pixel and a gate signal line coupled with an adjacent pixel via an interlayer insulating film between said pixel electrode and said gate signal line.

8. A liquid crystal display device as set forth in claim 6, wherein said backlight portion comprises at least one elongated backlight source and a light guide plate which is disposed on the backside of said liquid crystal display panel and which propagates light from said backlight source toward said liquid crystal display panel, said light guide plate comprising printed light scattering portions disposed on a surface thereof for adjusting a distribution of luminance of backlighting.

9. A liquid crystal display device as set forth in claims 6, wherein said backlight portion comprise an elongated backlight source disposed along the side of said liquid crystal display panel where said gate signal input portion is disposed.

10. A liquid crystal display device as set forth in claim 6, wherein said pixels each correspond to an equivalent circuit comprising:

a drain coupled to a drain signal line, said drain signal line having a gate coupled to said gate signal line;

a source corresponding to said pixel electrode coupled to an opposing electrode disposed on a substrate, said pixel electrode having a gate coupled to said gate signal line, a gap portion between said opposing electrode and said nitride film between said pixel electrode and said gate signal line being filled with liquid crystal;

said pixel electrode and said gate having a corresponding gate source capacitance, Cgs, said pixel electrode and said opposing electrode having a corresponding liquid crystal capacitance, Clc, said pixel electrode overlapping said gate signal line forming a corresponding storage capacitance, Csc, differences in amplitude of the gate signals defining a gate pulse amplitude, $\Delta Vg$, a total TFT leakage current flowing from said pixel electrode to said drain signal line until said TFT current is completely dissipated being defined as $\int Ids\, dt$;

and variation of storage capacitance, Csc, with distance from said gate signal line being defined as Cac', wherein:

$Csc'=[\{(Cgs)(\Delta Vg)-\int ids\, dt\}\{Clc+Csc+Cgs\}]/\{(Cgs)(\Delta Vg)\}-(Clc-Cgs)$.

11. A liquid crystal display device having a liquid crystal display panel, said liquid crystal display panel comprising:

a plurality of pixels which are disposed in a matrix having rows and columns and each of which has at least a thin film transistor (TFT) and a pixel electrode, each said pixel having an opening defining an aperture ratio;

a plurality of gate signal lines which extend from a gate signal input portion disposed along a side of said liquid crystal display panel and each of which is coupled with said TFT's in a row of said matrix;

auxiliary capacitor portions each additionally coupled with a pixel electrode of one of said pixel, the width of said gate signal line becomes narrower and thereby capacitance of said auxiliary capacitor portions becomes smaller as the distance from said gate signal input portion becomes larger, the aperture ratio increasing as the capacitance of said auxiliary capacitor portions becomes smaller;

capacitance of each of said auxiliary capacitor portions being determined by an area of an opposing portion between a pixel electrode of a pixel and a gate signal line coupled with an adjacent pixel via an interlayer insulating film between said pixel electrode and said gate signal line;

said pixels each corresponding to an equivalent circuit comprising:

a drain coupled to a drain signal line, said drain signal line having a gate coupled to said gate signal line;

a source corresponding to said pixel electrode coupled to an opposing electrode disposed on a substrate, said pixel electrode having a gate coupled to said gate signal line, a gap portion between said opposing electrode and a nitride film between said pixel electrode and said gate signal line being filled with liquid crystal;

said pixel electrode and said gate having a corresponding gate source capacitance, Cgs, said pixel electrode and said opposing electrode having a corresponding liquid crystal capacitance, Clc, said pixel electrode overlapping said gate signal line forming a corresponding storage capacitance, Csc, differences in amplitude of the gate signals defining a gate pulse amplitude, $\Delta Vg$, a total TFT leakage current flowing from said pixel electrode to said drain signal line until said TFT current is completely dissipated being defined as $\int Ids\, dt$;

and variation of storage capacitance, Csc, with distance from said gate signal line being defined as Csc', wherein:

$Csc'=[\{(Cgs)(\Delta Vg)-\int ids\, dt\}\{Clc+Csc+Cgs\}]/\{(Cgs)(\Delta Vg)\}-(Clc-Cgs)$.

* * * * *